(12) United States Patent
Nonaka et al.

(10) Patent No.: US 7,705,768 B2
(45) Date of Patent: Apr. 27, 2010

(54) RADAR IMAGE PROCESSOR AND METHOD OF RADAR IMAGE PROCESSING

(75) Inventors: Takashi Nonaka, Yokohama (JP); Takashi Shibayama, Yokohama (JP); Susumu Takagishi, Yokohama (JP); Tadashi Sasakawa, Kawasaki (JP)

(73) Assignee: Pasco Corporation, Tokyo (JP)

( * ) Notice: Subject to any disclaimer, the term of this patent is extended or adjusted under 35 U.S.C. 154(b) by 0 days.

(21) Appl. No.: 12/149,497

(22) Filed: May 2, 2008

(65) Prior Publication Data

US 2008/0291081 A1    Nov. 27, 2008

(30) Foreign Application Priority Data

May 7, 2007    (JP)    ............................. 2007-122281

(51) Int. Cl.
    *G01S 13/00*    (2006.01)
(52) U.S. Cl. ..................... 342/25 R; 342/176; 382/113; 382/190
(58) Field of Classification Search ............... 342/25 R
    See application file for complete search history.

(56) References Cited

U.S. PATENT DOCUMENTS 4,922,254 A * 5/1990 Schuessler et al. ......... 342/25 F
6,466,156 B1 * 10/2002 Ulander .................... 342/25 R

FOREIGN PATENT DOCUMENTS

JP    A-2006-003302    1/2006
JP    A-2006-199894    8/2006

OTHER PUBLICATIONS

Yuichiro Usuda et al.; *A study on Early Detection Method for Land Cover Change using Time-series SAR Images; Photogrammetry and Remote Sensing*; vol. 44, No. 6; 2005.

* cited by examiner

*Primary Examiner*—Thomas H Tarcza
*Assistant Examiner*—Timothy A Brainard
(74) *Attorney, Agent, or Firm*—Oliff & Berridge, PLC

(57)    ABSTRACT

In a radar image processing device and a radar image processing method which can accurately extract a change of a ground surface, a communication interface unit (10) obtains a plurality of radar image data of a same observation target obtained at different times and stores in a radar image storage unit (12), and a registration processor (14) reads the plurality of radar image data from the radar image storage unit (12) and registrates the radar image data with respect to each other. Then, a characteristic value calculating unit (18) calculates a plurality of characteristic values indicating a state of a ground surface which is the observation target based on the positioned radar image data. A change candidate region extracting unit (34) extracts change candidate regions for each of the characteristic values, and a judging unit (36) extracts a region of land cover change of the observation target from the change candidate regions using a threshold value, an extracting condition, and a judging function determined by a judgment method determining unit (24).

8 Claims, 4 Drawing Sheets

RADAR IMAGE PROCESSOR AND METHOD OF RADAR IMAGE PROCESSING

BACKGROUND OF THE INVENTION

1. Field of the Invention

The present invention relates to a radar image processing device and a radar image processing method which extracts a region of land cover change of an observation target from time series of image data obtained at different times by a radar device equipped in a flying object such as an artificial satellite and an airplane.

2. Description of the Related Art

Conventionally, techniques are put in practical use having a part of a ground surface as an observation target and which observes a change of the observation target. For example, there is known a method in which a change of a ground object is extracted using optical image data. However, because it is not possible to acquire optical image data at bad weather, there is a problem in that the method is not practical.

In consideration of this, a technique has been proposed for observing a change of a ground surface using a Synthetic Aperture Radar (SAR) or the like. The SAR is an active sensor which measures reflection, from the ground surface, of a microwave pulse irradiated from an artificial satellite or the like, and can observe in daytime and at nights and regardless of the weather. For example, Patent Document 1 discloses a technique which detects a change based on a correlation value of two radar image data of the observation target obtained at different times by a radar device. In addition, Non-Patent Document 1 discloses a technique which extracts a region of change of a ground surface based on a change in time of a backscattering coefficient of the radar image data.

[Patent Document 1] JP 2006-3302 A

[Non-Patent Document 1] Yuichiro USUDA, et al., "A study on Early Detection Method for Land Cover Change using Time-series SAR Images", Journal of the Japan Society of Photogrammetry and Remote Sensing, 44, 6, 48-57, 2005

In the above-described Patent Document 1, a coherence value indicating a correlation of two radar images obtained at different times is calculated, and the change with respect to time of an observation target occurring between the different times when the two radar images are obtained is detected through a threshold value process based on the coherence value, taking advantage of the fact that the coherence value is 1 when the two radar images completely match each other and approaches 0 as the difference between the two radar images is increased. However, in a region of vegetation, the coherence value is reduced due to change in season. In addition, there has been a problem in that when the baseline length of the SAR is large, the coherence value is reduced over the entire image.

In Non-Patent Document 1, on the other hand, a backscattering coefficient which depends on the projections and depressions on the ground surface and dielectric constant obtained from the SAR is obtained, a difference of scattering coefficients between different times is calculated, and pixels having a difference of a predetermined threshold value or greater is extracted as a region of land cover change. However, there has been a problem in that the scattering coefficient may change due to a change in the amount of moisture in soil even though the surface is not changed and the scattering coefficient may significantly change for a building with a slight difference in the angle of incidence.

Because of these circumstances, it has been difficult to accurately extract the presence/absence of a change in a ground surface by only one of the coherence value and the scattering coefficient, due to a difference in the imaging time, weather, angle of incidence, and ground coverage of the observation target.

In addition, when SAR data of a high resolution is used for extracting a region of land cover change such as a ground coverage, if a small region of land cover change is to be extracted, an excessive extraction part becomes large. For example, there is a possibility that a moving object such as an automobile is excessively extracted.

Moreover, the mechanism of the scattering of the microwave by a ground object is very complex and a speckle noise in a shape of dispersed dots is present in the image. Because of this, when it is determined whether or not there is a change merely by the threshold value, there is a possibility that many noise is erroneously extracted.

SUMMARY OF THE INVENTION

The present invention was conceived in view of the above-described circumstances, and an advantage of the present invention is that a radar image processing device and a radar image processing method are provided which can accurately extract a change of a ground surface.

In order to achieve at least the advantage described above, according to a first aspect of the present invention, there is provided a radar image processing device comprising a characteristic value calculating unit which calculates a plurality of characteristic values based on time series of image data of an observation target obtained by a radar device at different times, a judgment method determining unit which determines a judgment method of a change of the observation target using the plurality of characteristic values according to at least one of a form, a size, and an imaging condition of the observation target, and a change region extracting unit which extracts a region of land cover change of the observation target through the determined judgment method.

According to a second aspect of the present invention, it is preferable that, in the radar image processing device, the characteristic value calculating unit comprises a scattering coefficient calculating unit which calculates a scattering coefficient for each of the time series of image data of the observation target and a correlation indicator calculating unit which calculates an indicator indicating correlation.

According to a third aspect of the present invention, it is preferable that, in the radar image processing device, the characteristic value calculating unit further comprises a height calculating unit which calculates height information of a ground surface.

According to a fourth aspect of the present invention, it is preferable that, in the radar image processing device, the characteristic value calculating unit further comprises a standard deviation calculating unit which calculates a standard deviation of the scattering coefficient in a predetermined region.

According to a fifth aspect of the present invention, it is preferable that, in the radar image processing device, the judgment method determining unit obtains information related to the form of the observation target from a geographical information database or an optical image database.

According to a sixth aspect of the present invention, it is preferable that, in the radar image processing device, the judgment method determining unit selects at least one of a threshold value, an extraction condition, and a judging function to be used by the change region extracting unit for a process to extract the region of land cover change of the observation target.

According to a seventh aspect of the present invention, it is preferable that, in the radar image processing device, the time series of image data of the observation target is obtained by a synthetic aperture radar.

According to an eighth aspect of the present invention, there is provided a method of processing a radar image, comprising the steps of calculating a plurality of characteristic values based on time series of image data of an observation target obtained by a radar device at different times, determining a judgment method of a change of the observation target using the plurality of characteristic values according to at least one of a form, a size, and an imaging condition of the observation target, and extracting a region of land cover change of the observation target through the determined judgment method.

DESCRIPTION OF THE PREFERRED EMBODIMENT(S)

A preferred embodiment of the present invention (hereinafter, simply referred to as "embodiment") will now be described with reference to the drawings.

Figure 1:
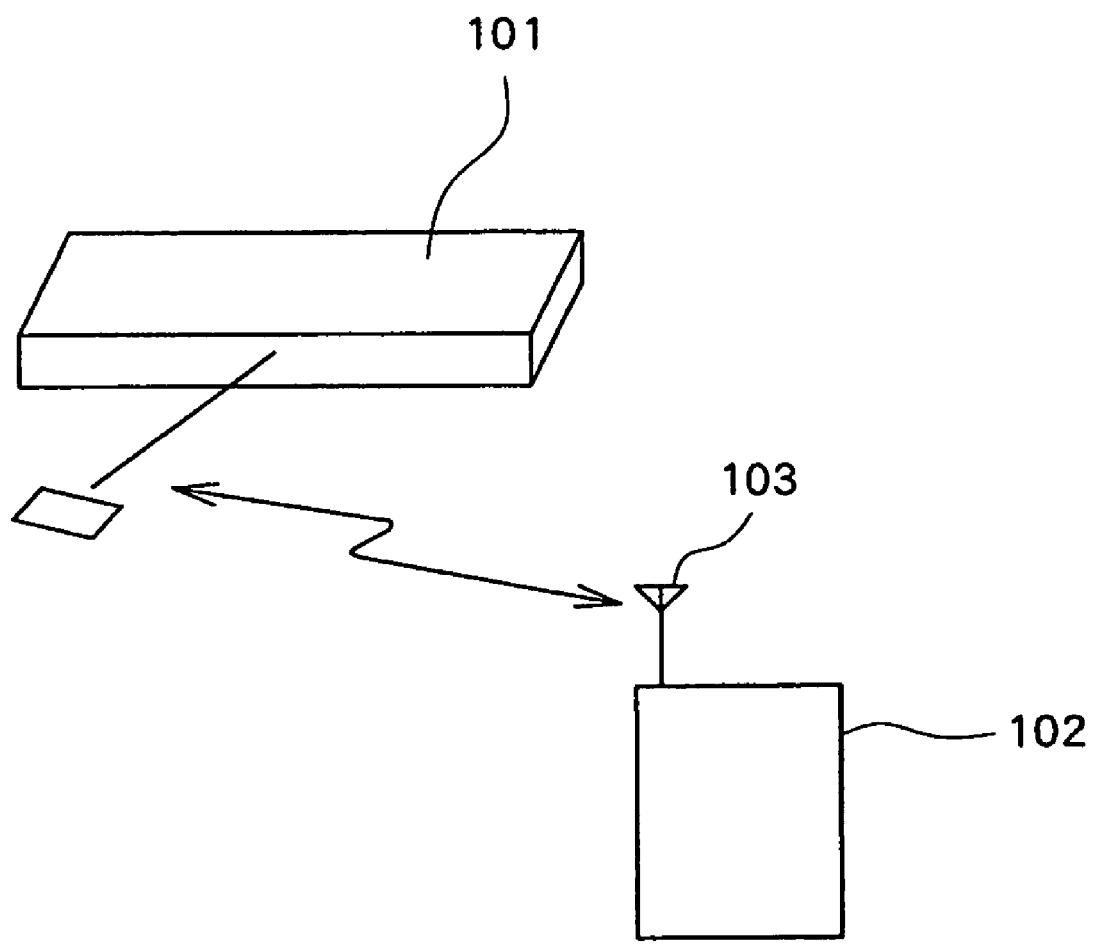
FIG. 1 is a diagram showing an example structure of a system for extracting a region of land cover change of an observation target using a radar image processing device according to a preferred embodiment of the present invention.

FIG. 1 shows an example structure of an embodiment of a system for extracting a region of land cover change of an observation target which uses a radar image processing device according to the present invention. In FIG. 1, radar image data of an observation target which is a desired region of a ground surface is obtained by a radar device such as a synthetic aperture radar equipped in an artificial satellite 101, and is transmitted to a radar image processing device 102 of the present embodiment. In the radar image processing device 102, the radar image data received through an antenna 103 is processed and a change of the ground surface (land cover) which is the observation target is analyzed. The radar image data in this case is time series of image data obtained by the radar device at different times. The radar image processing device 102 can be realized, for example, by executing a predetermined program on a computer.

The number of the artificial satellites 101 is not limited to 1, and a plurality of artificial satellites having the same imaging specification may be used. In this case, with the radar devices equipped in the plurality of artificial satellites 101, as will be described later, height information can be precisely obtained by an interferometry process. Alternatively, the radar device may be equipped on an airplane in place of the artificial satellite 101.

Figure 2:
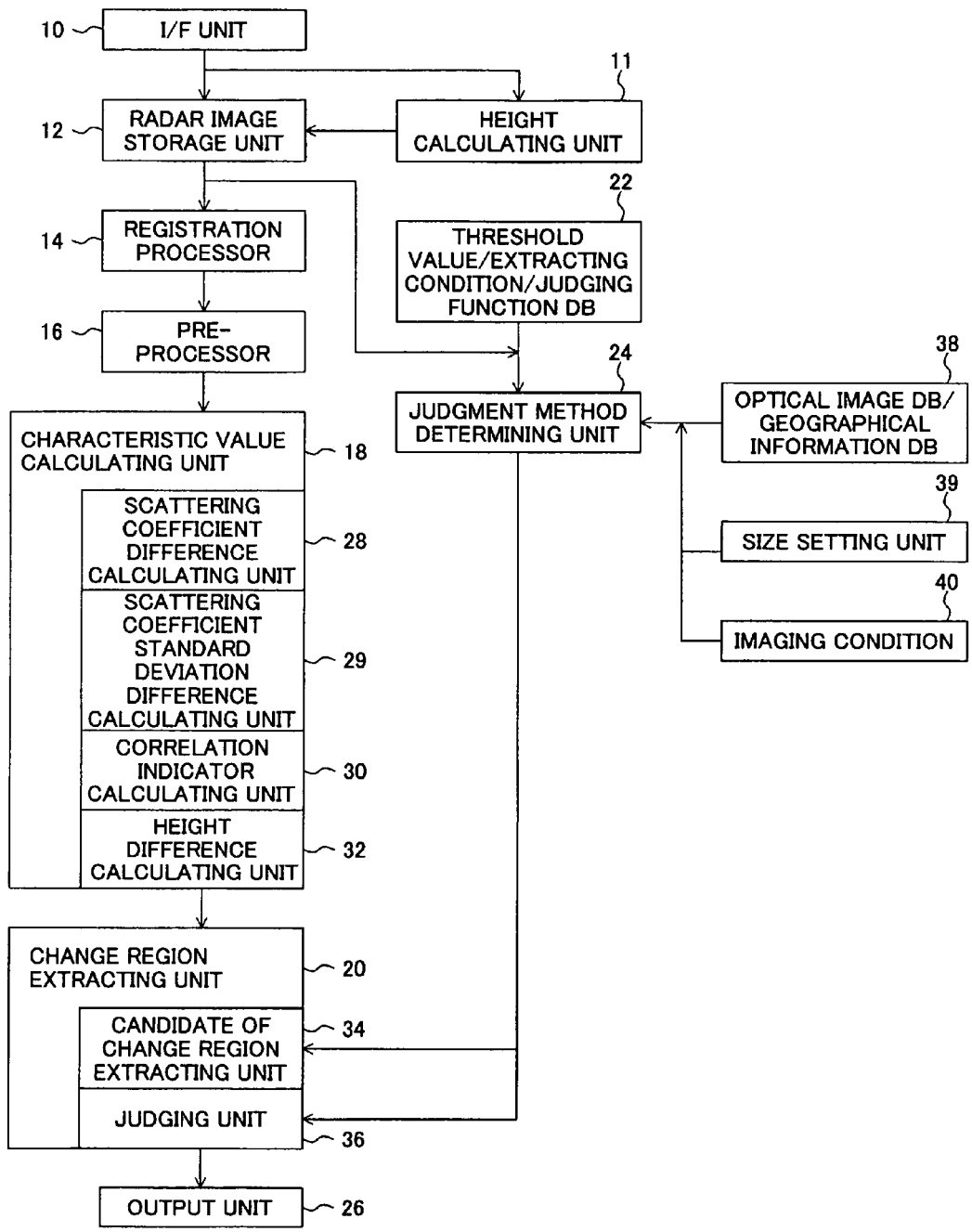
FIG. 2 is a functional block diagram of an example structure of a radar image processing device according to a preferred embodiment of the present invention.

FIG. 2 is a functional block diagram of an example structure of the radar image processing device 102 according to the present embodiment. In FIG. 2, the radar image processing device 102 comprises a communication interface unit 10, a height calculating unit 11, a radar image storage unit 12, a registration processor 14, a pre-processor 16, a characteristic value calculating unit 18, a change region extracting unit 20, a threshold value/extracting condition/judging function database unit 22, a judgment method determining unit 24, and an output unit 26.

The communication interface unit 10 comprises a suitable communication interface. The communication interface unit 10 communicates with the artificial satellite 101 and receives the radar image data which is time series of image data obtained at different times, and information on the image acquiring date and time, image acquiring position information, and angle data of incidence at the time of imaging, which are a part of the image acquiring conditions.

The height calculating unit 11 causes two simultaneously acquired images to interfere with each other, and calculates height information. Here, the height information includes digital surface model (DSM) which numerically represents elevation, gradient, etc., of aground surface including buildings and vegetations. For example, the height information may be determined by a radargrammetry based on a scattering coefficient obtained at different orbits, through a repeat pass interferometry process which causes two images acquired on a same orbit at different times to interfere each other, or a single pass interferometry process which causes two images acquired simultaneously by a plurality of antennas on a same orbit to interfere each other.

Figure 3:
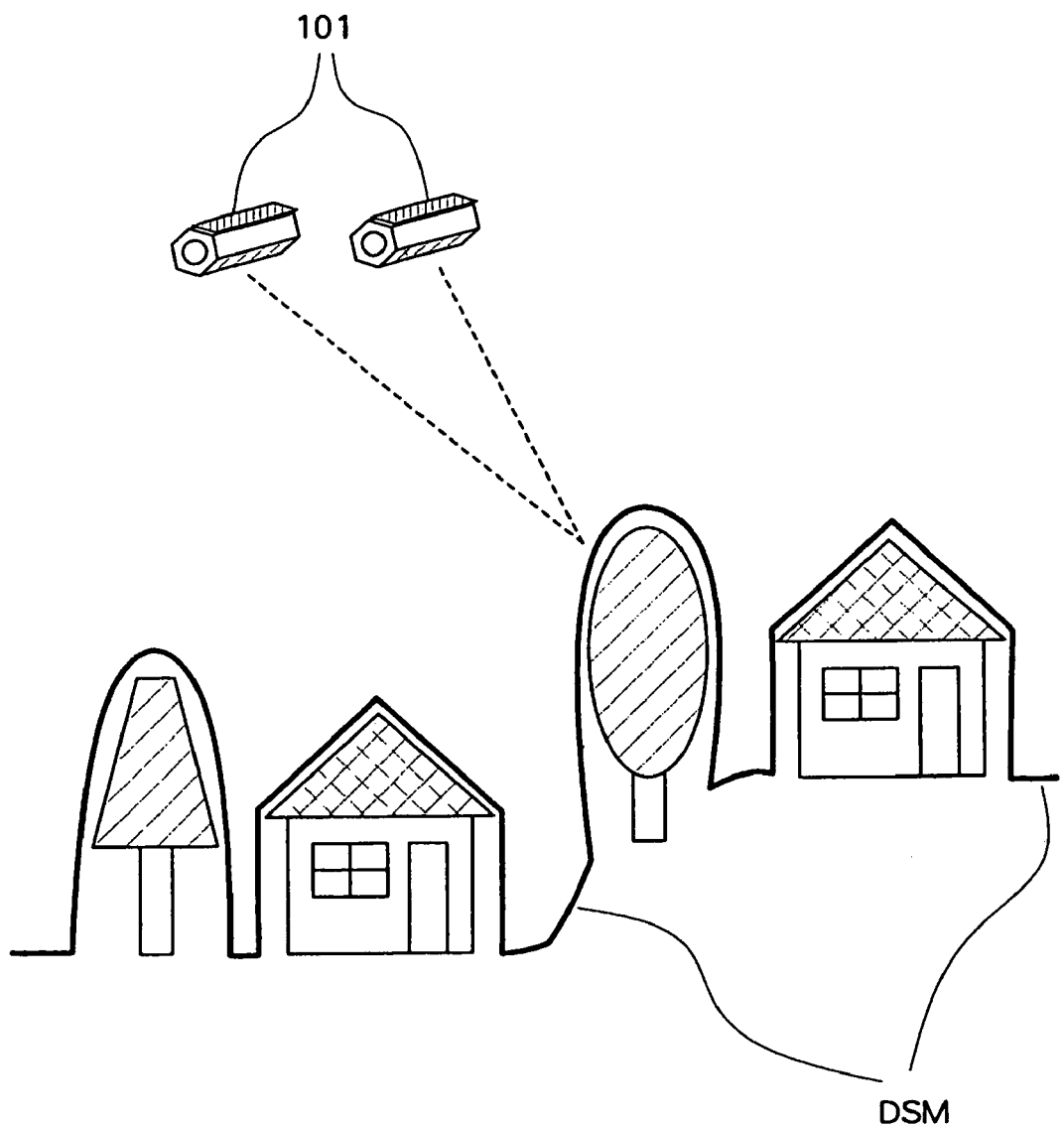
FIG. 3 is a diagram showing an example measurement of a DSM.

FIG. 3 shows an example measurement of DSM. In FIG. 3, the elevation, gradient, etc., of the ground surface including buildings and vegetations are shown as DSM. With recent satellite SARs, height information with a high-resolution and a high precision can be obtained, and, thus, it is possible to use the DSM as one of the characteristic values.

The radar image storage unit 12 is composed of a magnetic storage device or the like, and stores radar image data received by the communication interface unit 10, the height data calculated by the height calculating unit 11, and information on the image acquiring date and time, image acquiring position information, and angle data of incidence at the time of imaging, which are a part of the image acquiring conditions.

The registration processor 14 reads, from the radar image storage unit 12, a plurality of radar image data of a same observation target obtained at different times and registrates the radar image data with respect to each other. The registration process is executed because the corresponding pixels of the radar image data must be matched in the characteristic value calculating process to be described later.

The pre-processor 16 executes a filtering process for removing noise included in the radar image data. When high resolution SAR data is used, the pixel size may be changed according to the land cover and scale (dimension) of the observation target (re-sampling process). For the filtering process, for example, an averaging process or the like may be used, and the filtering process may be realized either by hardware or by software.

The characteristic value calculating unit 18 is realized by a central processing unit (CPU) and an operation program, and calculates a plurality of characteristic values indicating a state of a ground surface which is the observation target. The characteristic values include, for example, the scattering coefficient, a standard deviation of the scattering coefficient, an indicator indicating correlation, and height information of the ground surface. For this purpose, the characteristic value calculating unit 18 includes a scattering coefficient difference calculating unit 28, a scattering coefficient standard deviation difference calculating unit 29 which calculates the standard deviation of the scattering coefficient in a suitable pixel region, a correlation indicator calculating unit 30, and a height difference calculating unit 32. In addition, when images with multiple frequencies and multiple polarizations are obtained, the characteristic values may be determined for each image. In this case, the radar image storage unit 12 receives polarization information by the communication interface unit 10 and stores the polarization information.

The scattering coefficient difference calculating unit 28 calculates, for each pixel, a backscattering coefficient of a plurality (for example, 2) of radar image data for a same observation target which are obtained at different times, and determines a difference between the plurality of radar image data. The scattering coefficient standard deviation difference calculating unit 29 calculates the standard deviation of the scattering coefficient in a suitable peripheral pixel region for each pixel, and calculates a difference between the plurality of radar image data. Here, the size of the peripheral pixel region is determined, for example, based on the size of the ground object to be detected and the density of the ground object. When the size of the peripheral pixel region is too large, an oversight of extraction may occur, and, when the size is too small, the objects are excessively extracted. Therefore, the size of the peripheral pixel region must be suitably determined corresponding to the size of the target ground object. Because the use of the standard deviation difference of the scattering coefficient allows a change of the land cover to be extracted based on a change of a degree of variation of the scattering coefficient, such a configuration is particularly advantageous in areas of use of the land (such as, for example, a region of vegetation) which is highly likely to have a larger spatial variation of the scattering coefficient compared to buildings or the like in urban areas.

The correlation indicator calculating unit 30 calculates an indicator which indicates correlation of images for the plurality of radar image data (for example, a correlation coefficient or coherence value of scattering coefficient). For example, when a correlation coefficient of scattering coefficient of the pixel is calculated, a correlation coefficient in a suitable peripheral pixel region centered at the pixel is calculated. Similar to the above-described case of determination of the standard deviation of the scattering coefficient, the size of the peripheral pixel region is determined based on, for example, the size of the detection target ground object and the density of the ground object. The height difference calculating unit 32 calculates height information of a ground surface for the plurality of radar image data, and calculates differences in the height information.

The change region extracting unit 20 is realized with a central processing unit (CPU) and an operation program, and extracts a region of land cover change in which the state of the ground surface which is the observation target has changed with elapse of time, based on the characteristic value calculated by the characteristic value calculating unit 18. The change region extracting unit 20 comprises a change candidate region extracting unit 34 and a judging unit 36.

The change candidate region extracting unit 34 extracts a candidate of a region of land cover change for each of the plurality of characteristic values calculated by the characteristic value calculating unit 18, for example, a difference in scattering coefficient, a difference in standard deviation of scattering coefficient in a suitable peripheral pixel region, a correlation indicator, and a difference in height information. The extracting process is executed by setting a threshold value and an extracting condition for each characteristic value. The setting of the threshold value is executed by, for example, setting a value determined based on a land cover and a reference value, by evaluating a size of a noise in a plurality of images of the observation target in advance and setting a value considering the size of the noise, or approximately estimating a percentage of the region of land cover change and setting a value which is statistically determined. A change candidate region is determined using the threshold value and the extracting condition. For example, an extracting condition may be set such as, when pixels having a difference in characteristic values such as the scattering coefficient and the standard deviation of the scattering coefficient exceeds a threshold value are surrounded by a polygon, polygons having a certain area or larger area is extracted, and a region is extracted as a change candidate region. With this process, it is possible to reduce erroneous extraction of the noise of SAR. In this manner, by combining the threshold value and the extracting condition, it is possible to adjust the extraction precision of the change candidate region. For example, a method may be employed in which change candidate regions are extracted, with the threshold value, in relatively large number, and the change candidate regions can be narrowed with the extracting condition. Alternatively, in place of the difference in the characteristic values such as the scattering coefficient and the standard deviation of the scattering coefficient, it is possible to employ a configuration in which a region is determined as a change candidate region when a correlation indicator is less than or equal to a predetermined threshold value or a difference in the height information exceeds a predetermined threshold value. The threshold value and the extracting condition may be determined by a judgment method determining unit 24 to be described later or may be set by the administrator.

Based on the change candidate regions extracted for each characteristic value, the judging unit 36 judges a change of the ground surface which is the observation target and extracts a region of land cover change. A judging function used for the judgment is determined by the judgment method determining unit 24 to be described later and passed to the judging unit 36. The judging function may be constructed, for example, in which a distribution point of a weight is assigned to each characteristic value such as the difference in the scattering coefficient, the difference in the standard deviation of the scattering coefficient in a suitable size, the indicator indicating the correlation, and the difference in height information, a total point is calculated for each pixel, and a region is judged as a region of land cover change when the total point exceeds a predetermined threshold value.

The threshold value/extracting condition/judging function database unit 22 is formed with a magnetic storage device or the like, and stores the threshold value, the extracting condition, and the judging function.

The judgment method determining unit 24 is realized with the CPU and an operation program, and obtains information related to the form of the region which is the observation target from an external optical image database/geographical information database 38. In addition, a size setting unit 39 for traced ground object sets, in advance, a size of the observation target to be extracted as a region of land cover change. With the setting value, it is possible to determine whether or not an object, for example, an automobile, is to be extracted as a region of land cover change according to the number of pixels and the shape in the pixel region in which there is a change. Based on at least one of these information and the image acquiring conditions (such as wavelength and pixel size) which are stored in advance other than the image acquiring date and time and the angle data of incidence, at least one of the threshold value, the extracting condition, and the judging function is obtained from the threshold value/extracting condition/judging function database unit 22. The above-described form is information indicating, for example, whether the region which is the observation target is a city region, a mountain region, or a rural region. Because it is possible to determine which of the characteristic values should be evaluated with what degree of importance based on the difference in the form, a suitable threshold value, a suitable extracting condition, and a suitable judging function can be selected. In addition, in consideration of the fact that the correlation value of the indicator indicating the correlation is reduced for different seasons and that the amount of moisture has a large influence during a rain season, a suitable threshold value, a suitable extracting condition, and a suitable judging function are selected according to the time of the year of the image acquiring. In the urban region, because the multiple scattering by the buildings changes depending on the imaging position and the incidence angle at the time of imaging, this point is also considered. The judgment method determining unit 24 passes the threshold value and the extracting condition obtained from the threshold value/extracting condition/judging function database unit 22 to the change candidate region extracting unit 34, and passes the judging function to the judging unit 36.

The outputting unit 26 outputs the region of land cover change extracted by the change region extracting unit 20 as the image data or the like. Example methods of output include printout and display on a screen.

Figure 4:
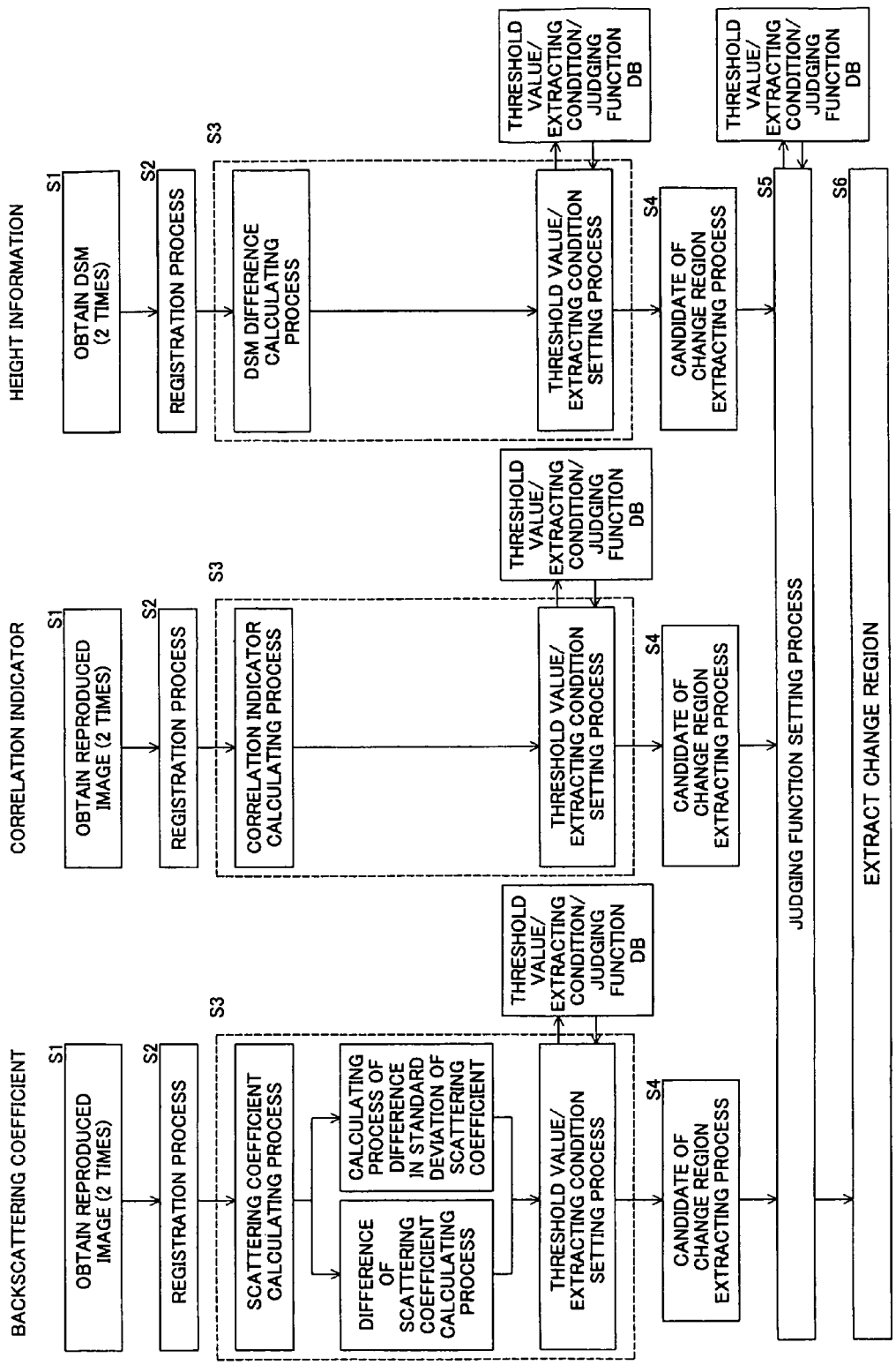
FIG. 4 is a flowchart of an example operation of a radar image processing device according to a preferred embodiment of the present invention.

FIG. 4 shows a flow of an example operation of the radar image processing device 102 of the present embodiment. In FIG. 4, an example configuration is shown in which the backscattering coefficient, correlation indicator, and height information (DSM) are used as the characteristic values. In FIG. 4, the communication interface unit 10 obtains a plurality of radar image data (reproduced image) for a same observation target obtained at different times, and stores the radar image data in the radar image storage unit 12 (S1). With regard to the height information, the height information can be obtained with a high precision through an interferometry process using radar devices equipped in a plurality of the artificial satellites 101 having the same image acquiring specification. In this case, the data does not need to be in the form of data re-constructed as an image (reproduced image) as in the case where the backscattering coefficient and the correlation indicator are used, and the height information (DSM) at a predetermined coordinate may be stored without any processing. The registration processor 14 reads the plurality of radar image data from the radar image storage unit 12, and registrates the radar image data relative to each other (S2).

A pre-processor 16 applies a filtering process on the radar image data after the positioning process to remove the noise, and the size is changed to a suitable pixel size by a re-sampling process. Then, the characteristic value calculating unit 18 calculates a plurality of the characteristic values which indicate the state of the ground surface which is the observation target (S3). The calculation of the characteristic values is executed by the above-described scattering coefficient difference calculating unit 28, scattering coefficient standard deviation difference calculating unit 29 for a suitable peripheral pixel region, correlation indicator calculating unit 30, and height difference calculating unit 32 executing respective calculations of the difference in the scattering coefficient, the difference in the standard deviation of the scattering coefficient in a suitable peripheral pixel region, the correlation indicator such as the correlation coefficient and the coherence value, and the difference in DSM. In this process, the judgment method determining unit 24 obtains the threshold value and the extracting condition for each of the characteristic values from the threshold value/extracting condition/judging function database unit 22.

The change candidate region extracting unit 34 of the change region extracting unit 20 extracts the change candidate region using, for each characteristic value, the threshold value and the extracting condition obtained from the threshold value/extracting condition/judging function database unit 22 by the judgment method determining unit 24 (S4). The judgment method determining unit 24 also determines the judging function based on the information related to the form of the region, which is the observation target obtained from the optical image database/geographical information database 38, and the image acquiring condition (S5). The judging unit 36 of the change region extracting unit 20 extracts the region of land cover change of the observation target from the change candidate region using the judging function (S6).

What is claimed is:

1. A radar image processing device comprising:
   a characteristic value calculating unit that calculates multiple kinds of characteristic values based on time series of image data of an observation target obtained by a radar device at different times;
   a judgment method determining unit that determines a judgment method of a change of the observation target using the multiple kinds of characteristic values according to at least one of a form, a size, and an image acquiring condition of the observation target;
   a change region extracting unit which extracts a region of land cover change of the observation target through the determined judgment method;
   the judgment method is such that a distribution point of a weight is assigned to each of the characteristic values, a total point is calculated for each pixel, and a region is judged as a region of land cover change when the total point exceeds a predetermined threshold value.

2. The radar image processing device according to claim 1, wherein
   the characteristic value calculating unit comprises a scattering coefficient calculating unit which calculates a scattering coefficient for each of the time series of image data of the observation target and a correlation indicator calculating unit which calculates an indicator indicating correlation.

3. The radar image processing device according to claim 2, wherein
   the characteristic value calculating unit further comprises a height calculating unit which calculates height information of a ground surface.

4. The radar image processing device according to claim 2, wherein
   the characteristic value calculating unit further comprises a standard deviation calculating unit which calculates a standard deviation of the scattering coefficient in a predetermined region.

5. The radar image processing device according to claim 1, wherein
   the judgment method determining unit obtains information related to the form of the observation target from a geographical information database or an optical image database.

6. The radar image processing device according to claim 1, wherein
   the judgment method determining unit selects at least one of a threshold value, an extracting condition, and a judging function to be used by the change region extracting unit for a process to extract the region of land cover change of the observation target.

7. The radar image processing device according to claim 1, wherein the time series of image data of the observation target is obtained by a synthetic aperture radar.

8. A method of processing a radar image, comprising:

calculating multiple kinds of characteristic values based on time series of image data of an observation target obtained by a radar device at different times;

determining a judgment method of a change of the observation target using the multiple kinds of characteristic values according to at least one of a form, a size, and an imaging condition of the observation target; and extracting a region of land cover change of the observation target through the determined judgment method, the judgment method comprising:

assigning a distribution point of a weight to each of the characteristic values, calculating a total point for each pixel, and judging a region as a region of land cover change when the total point exceeds a predetermined threshold value.

* * * * *